US005438738A

United States Patent [19]

Stolz et al.

[11] Patent Number: 5,438,738

[45] Date of Patent: Aug. 8, 1995

[54] THEFT-DETERRENT DEVICE FOR ATTACHMENT TO THEFT-ATTRACTIVE ARTICLES

[75] Inventors: Klas Stolz, Majgårdsvägen; Bo Gustavsson, Gökvägen, both of Sweden

[73] Assignee: Färgklämman Svenska AB, Huddinge, Sweden

[21] Appl. No.: 274,268

[22] Filed: Jul. 13, 1994

[30] Foreign Application Priority Data

May 9, 1994 [SE] Sweden ............................ 94016045

[51] Int. Cl.[6] ........................ F16B 21/00; E05B 65/00

[52] U.S. Cl. ................................ 24/704.1; 24/704.2; 70/57.1

[58] Field of Search ................ 24/704.1, 704.2, 706.8, 24/707.1; 70/57.1

[56] References Cited

U.S. PATENT DOCUMENTS 4,944,075 7/1990 Hogan .
5,022,244 7/1991 Charlot, Jr. .
5,054,172 10/1991 Hogan et al. .
5,088,165 2/1992 Minasy et al. .
5,205,024 4/1993 Willard ............................... 70/57.1
5,275,122 1/1994 Stolz et al. .
5,309,740 5/1994 Hansen .............................. 24/704.1

*Primary Examiner*—Victor N. Sakran
*Attorney, Agent, or Firm*—Browdy and Neimark

[57] ABSTRACT

The present invention relates to a theft-deterrent device which is intended for attachment to theft-attractive articles and which includes a first element (1) which is provided with a connecting unit (5) that projects out from the first element. The connecting unit is intended to be inserted through the article to be protected. The article is locked to the device by attaching and locking the connecting unit to a second element (2). The first element includes a fragile marking substance container (6) which is broken or crushed when an attempt is made to release the elements from each other, so as to release a marking substance contained in the container and therewith render the article unusable. The first element includes a base element (4) which has the form of a one-piece structure and which includes a recess (7) having an opening through which the container (6) can be inserted into the recess. The connecting unit (5) can is insertably arranged in the base element and is constructed to hold the container in the recess.

20 Claims, 2 Drawing Sheets

THEFT-DETERRENT DEVICE FOR ATTACHMENT TO THEFT-ATTRACTIVE ARTICLES

The present invention relates to a theft-deterrent device which is intended to be attached to theft-attractive articles and which includes a first element having a connecting unit which projects out from said first element and which is intended to be inserted through the article to be protected. The article is locked to the theft-deterrent device by means of a second element which can be attached to and locked on the connecting unit. One of the aforesaid elements includes a fragile container which contains a marking substance and which is intended to be broken or crushed in an unauthorized attempt to release the elements from each other, and therewith release the staining substance from the container and render the article unusable in conjunction therewith.

Theft-deterrent devices of this kind are used to prevent the theft of attractive articles and to cause people to refrain from stealing such articles, such as clothing, footwear, bags and other easily-carried goods from retail shops. A theft-deterrent device of this kind is intended to be attached to an article in a manner in which the device can only be removed from the article with the aid of a special release device. It is assumed that a potential thief will not have access to this special release device, at least not in the place where the article is on sale. The purpose of such theft-deterrent devices is to render the article unusable to all practical intents and purposes should an attempt be made to remove or to force the device without the aid of the special release device, either by tearing the article or by causing a fragile container which contains a dye, an ill-smelling substance or some other appropriate marking substance to rupture and release the marking substance so as to stain the article or to damage the article in some other way.

Theft-deterrent devices of this kind can often be bought and used in large numbers, which means that particular requirements are placed on the function and constructive design of such deterrents. Because of this, it is very important that the theft-deterrent device has a simple construction and can be manufactured at low costs. High demands are also placed on the functional reliability of the active elements of said device, since these elements are often used together with capital goods that have high values. For instance, the elements shall be designed to destroy an article positively when an unauthorized person attempts to loosen the elements of said device from one another in different conceivable ways. When the container that contains the marking substance has been ruptured by such unauthorized action, it is important that the element will permit the marking substance to spread effectively to the article concerned, so as to render the article unusable. At the same time, the construction must be such as to prevent the marking substance container from rupturing when the article or the theft-deterrent device is handled normally. The device should also be light in weight, which is particularly important when the protected article is comprised of a thin or delicate material, since the article may be damaged or torn if the weight of the tag is too heavy.

Theft-deterrent devices of the aforedescribed kind which comprise marking substance containers are previously known to the art in different forms. For instance, U.S. Pat. No. 5,275,122 teaches a theft-deterrent device whose one element or part includes one or more marking substance ampules which, together with a connecting unit, are enclosed and anchored in a housing or casing. The casing is comprised of two parts which are welded together or permanently joined in some other way. Similarly, U.S. Pat. 5,054,172 teaches a theft-deterrent device comprising marking substance ampules and other parts which are mounted between two casing parts mutually joined by ultrasonic welding, so as to enclose the component parts in the casing. These and other known theft-deterrent devices have a complicated construction, meaning that the manufacture and assembly of such devices is expensive. Assembly of the various elements or components of the known theft-deterrent devices also requires the use of special equipment, for instance an ultrasonic welding device, which adds to the expensive of the production.

An object of the present invention is to solve the aforesaid problems by providing a light-weight theft-deterrent device which is extremely reliable in operation but which, nevertheless, is of simple construction and therewith cheap to manufacture.

In accordance with the invention, this object has been achieved with a theft-deterrent device of the construction defined in the following Claims.

The invention will now be described in more detail with reference to an exemplifying embodiment of the invention and also with reference to the accompanying drawings, in which FIG. 1 illustrates an inventive theft-deterrent device as seen one side thereof (the outside);

Figure 2:
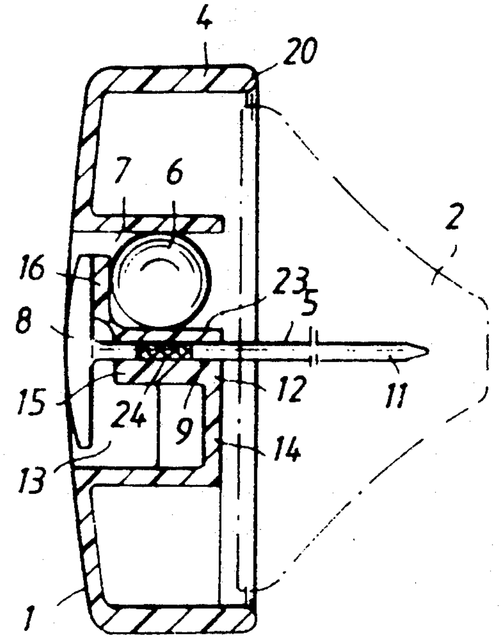
FIG. 2 is a sectioned view of the device taken on the line II—II in FIG. 1, wherein the second element or part which can be locked to the connecting element is merely indicated.

As will best be seen from FIG. 2, the inventive theft-deterrent device includes generally four main components, namely a base element 4, a locking element 2, a marking substance container 6 and a connecting unit 5. The base element 4, the marking substance container 6 and the connecting unit 5 together form the first element or part 1 of the device.

The connecting unit 5 is arranged in the base element 4, such that a generally pin-shaped connecting element 11 projects out from one side 19 of the base element 4. The connecting element 11 coacts with the locking element 2, so as to enable it to be connected with the connecting element and automatically locked thereon against movement in a direction away from the base element 4.

The locking element 2 is indicated with a dashed line in FIG. 2 and the design of this locking element forms no part of the present invention. The locking element includes a number of small metal balls which are disposed in a ball sleeve and a ball guide such as to be clamped firmly against the pin-shaped connecting element 11 when a separating force is exerted on the base element 4 and the locking element 2, whereas the balls are arranged so as not to prevent axial movement of the two elements 2; 4 towards one another. Naturally, other types of locking devices having the same or similar functions are feasible within the scope of the invention.

The article to be protected and on which the illustrated theft-deterrent device is intended to be fastened is not shown in the drawings. However, the device is attached to an article by inserting the connecting element 11 through the article at an appropriate place thereon or through an existing small hole in the article, such as for instance a buttonhole, whereafter the locking element 2 is fitted to the attachment element 11. The two elements are locked together and therewith also to the article positioned therebetween.

The locking device can be released in a known manner with the aid of a release device, such that the locking element 2, and therewith the entire theft-deterrent device, can be released and removed from the article, for instance after the article has been paid for and a receipt has been issued. It will be understood that only authorized persons, for instance cashiers, will have access to this release device.

The base element 4 is shown in detail in FIGS. 1–6. The base element 4 is comprised of an element, preferably made of plastic material, which has the form of a one-piece structure, for instance an injection-moulded structure. The base element 4 is configured in individual details, so as to be lean on material and therewith also low in weight.

Figure 3:
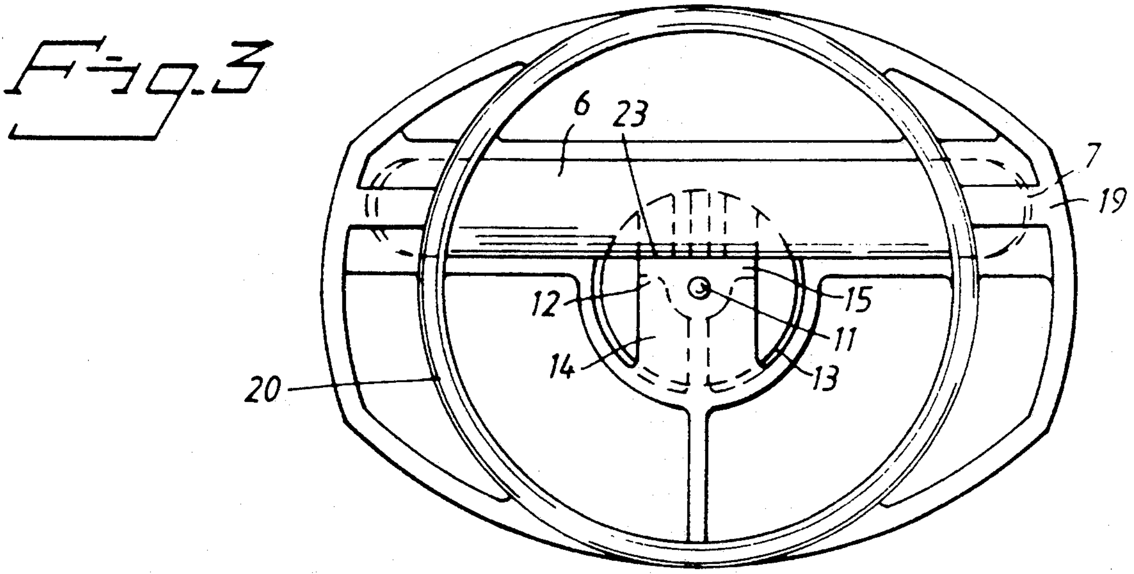
FIG. 3 illustrates the inventive device from the opposite/side to that shown in FIG. 1 (the inside), with the second element omitted for the sake of clarity.
Figure 4:
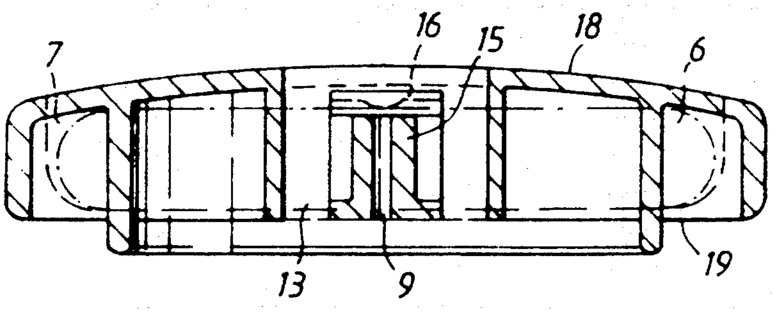
FIG. 4 is a section view of the device taken on the line IV—IV in FIG. 1, with the connecting element and the lockable second element omitted.
Figure 5:
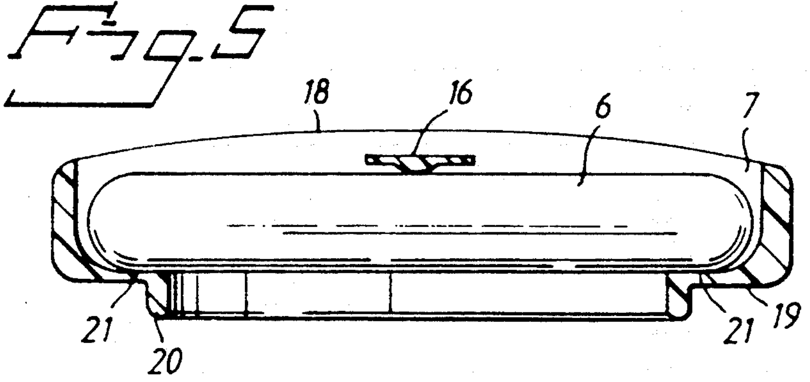
FIG. 5 is a section view of the theft-deterrent device similar to FIG. 4 and taken on the line V—V in FIG. 1.

A through-penetrating attachment hole 9 is provided, preferably centrally, in an attachment bridge 12 in the base element 4, as will be best seen from FIGS. 2 and 3. The attachment bridge 12 extends into a generally cylindrical cavity 13 provided centrally on the base element 4, and is fastened in the cylinder wall with the aid of a fastener part 14 which merges with a suspension part 15 disposed generally perpendicular to the fastener part. The attachment hole 9 extends through the suspension part 15 parallel with a flat outer wall 23 thereof, see FIG. 2.

Figure 6:
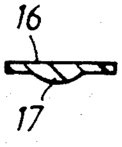
FIG. 6 is a cross-sectional view of the tongue taken on the line VI—VI in FIG. 1.

A tongue 16 extends from the outer edge of the flat outer wall 23 of the attachment bridge 12. The thin connection between the tongue 16 and the suspension part 15 enables the tongue to be pivoted readily about the outer edge of said suspension part. FIG. 6 is a cross-sectional view of the tongue 16 and it will be seen from this Figure that a shoulder 17 is provided on the underside of the tongue in the longitudinal direction of the attachment bridge 12.

Figure 1:
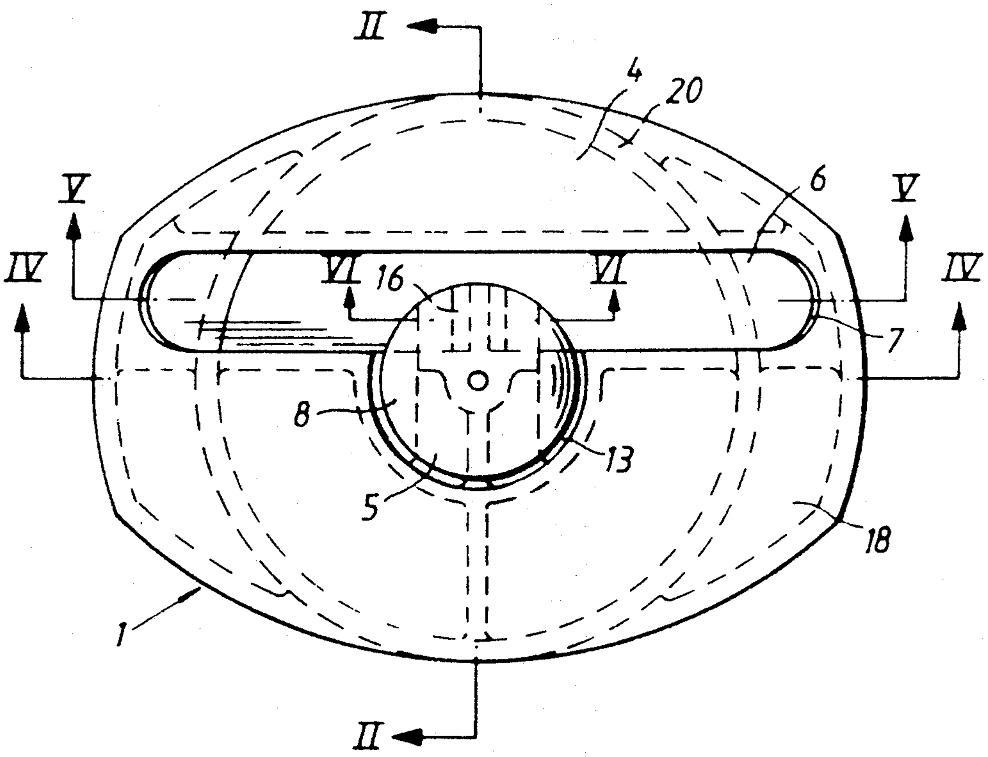

As shown in FIGS. 1 and 3, the base element 4 includes an elongated recess 7. The recess 7 is preferably formed in line with the flat outer wall 23 of the attachment bridge 12 and connects with the cylindrical cavity 13. As will best be seen from FIGS. 3 and 5, the recess 7 is fully open towards the outside 18 of the base element but is only partially open towards the inside 19 of said base element.

The inside 19 of the base element includes an outwardly projecting, generally circular lip 20 and the opening of the recess 7 extends radially inwards of the lip in a direction towards the inside 19 of the base element. As indicated in FIG. 2, the locking element 2 will preferably have a circular shape, the outer diameter of which will be slightly smaller than the inner measurement of the lip 20. Consequently, when the locking element 2 is locked to the base element 4, the locking element will be partially embraced by the lip 20. This construction makes it more difficult to loosen the two parts from one another by force, because it is difficult or even impossible to insert a tool between said parts.

The marking substance container 6 preferably comprises a tubular, circular-cylindrical ampule made of glass or some other fragile material. The ampule interior will preferably be under a given overpressure and contain a liquid marking substance in the form of a dye and/or an ill-smelling substance. The external measurements of the ampule, i.e. its length and diameter, will be such as to enable the ampule 6 to be accommodated in the recess 7.

As described above, the connecting unit 5 includes an connecting element 11 in the form of an elongated pin or needle-like part, and an abutment part 8 which, in accordance with the preferred embodiment of the invention, is configured as a circular head on the connecting element 11. The connecting unit 5 is preferably made of metal, although it may alternatively be made of other materials within the scope of the invention.

The particular construction of the base element 4 enables the various parts of the theft-deterrent element 1 to be assembled very easily and effectively. The tongue 16 is first twisted out so as to fully expose the recess 7 and therewith enable the ampule 6 to be placed in the recess. The ampule 6 is supported in the recess 7 at its end-parts against movement towards the inside 19 of the base element, as will be best seen from FIG. 5. The depth of the recess 7 is greater than the diameter of the ampule 6, which means that the outer surface of the ampule will be located inwardly of the outer surface of the outside 18 of the base element. The ampule 6 is therewith well-protected in the base element 4, although it can be seen clearly from outside the element, which has a deterring effect.

After having placed the ampule 6 in the recess 7, the needle-shaped connecting element 11 is passed from the outside 18 of the base element into and through the attachment hole 9 in the attachment bridge 12. A part 24 of the surface of the connecting element 11, or alternatively the surface of the attachment hole 9 or its dimensions is/are appropriately formed so as to require pressure to be exerted on the connecting element 11 in order to pass the same through the attachment hole 9, in the manner of a press fit. The connecting unit 5 will thereby be retained in its inserted position in the base element 4 by friction. When inserting the connecting unit 5 into the attachment hole 9, the tongue 6 is pressed back over the recess 7 to a position in which the tongue is in abutment with the ampule 6. In the assembled state, the abutment part 8 will thus lie with its flat undersurface against the tongue 16, the shoulder 17 of which will lie against the ampule 6. The theft-deterrent element 1 is thus assembled with the aid of only a few hand manipulations and no mechanical devices are required for joining the theft-deterrent together, therewith substantially reducing the cost of the product.

Should an attempt be made to loosen the locking element 2 locked to the connecting element 11 from the theft-deterrent element 1 by force, the pulling force and/or side forces acting on the locking element 2 will result in movement in the connecting element 11. Movement of the connecting element 11, and therewith also movement of the abutment part 8, is facilitated by the fact that the attachment bridge 12 is mounted in a manner which allows the bridge and thus the connecting unit 5 suspension means to give or spring. Because the ampule 6 containing the marking substance is supported against movement at its end-parts, the ampule 6 will either be crushed by the surface pressure exerted by the tongue 16, the shoulder 17 and the abutment part 8 as a result of this movement, or will be bent in its centre region and therewith broken.

The connecting unit 5 including the connecting element 11 and abutment part 8 thus has the dual function of providing means for fixating the ampule 6 in the base element 4 and means for effectively breaking the ampule 6 when the theft-deterrent device is handled forcibly.

It will be understood that the invention is not restricted to the aforedescribed exemplifying embodiment thereof and that several modifications are conceivable within the scope of the Claims. In the case of the exemplifying embodiment, there has been described a theft-deterrent device which comprises only one marking substance container, although it will be understood that the invention also covers devices that include several marking substance containers. It will also be understood that marking substance containers of types different to that described and illustrated may also be used in accordance with the invention, and that the container is not restricted to the illustrated and described elongated ampule-form. Furthermore, the pressure in the interior of the container may be atmospheric pressure instead of an overpressure. The recess provided in the base element for accommodating the marking substance container or containers may have a form different to that shown and may suitably be adapted to the shape of the containers. The ampule or the container may also be supported against movement either completely or only partially.

The inventive theft-deterrent device may also be supplemented with an alarm means mounted in one of the elements of said device such as to be made active if an attempt is made to leave the store without having paid for the article to which the device is attached. The locking element which can be attached and locked to the connecting element may have any outer shape and therefore need not necessarily be accommodated inwardly of the circular protective lip or flange. According to another preferred embodiment, the locking element has a larger width expansion than the theft-deterrent element, so that the locking element will embrace the outer edges of the theft-deterrent element instead.

The invention also covers the case when the base element is not provided with a resilient bridge for suspending the connecting unit, but wherein the connecting unit is instead fixed directly in the base element, which is then given a form which will allow some flexibility in the suspension of the connecting unit. This can be achieved, for instance, by thinning parts of the material so as to provide resiliency in the construction or by forming weakenings which provide resiliency in the construction by breakage of the material.

In an alternative embodiment of the invention the connecting element and/or the attachment hole may have dimensions such that the connecting element is freely and rotatably mounted in the attachment hole in the assembled state. A locking washer coacting with grooves in the connecting element at the inside of the base element is arranged in order to retain and lock the connecting unit in its inserted position in the base element. The connecting unit is thus locked in the base element in such a way that it forms a swivel head.

The base element may be constructed so that the abutment part will lie directly against the marking substance container in the absence of an intermediate tongue or other parts which are influenced by the abutment part. The abutment part may also be placed differently on the connecting element and may have another form, for instance it may comprise two parts, of which one part forms a breaking element and the other forms a fixing element. According to another preferred embodiment of the invention, the connecting unit is provided with a needle-shaped connecting element to which there is fastened an annular abutment part, for instance soldered thereto. The annular abutment part is shaped to surround the marking substance container and after having placed the container in the annular abutment part, the connecting unit is inserted in the attachment hole. The annular abutment part has the aforedescribed dual function of forming a means for securing the container in the base element and a means for breaking the container when the theft-deterrent device is subjected to undue force.

We claim:

1. A theft-deterrent device which is intended for attachment to theft-attractive articles and including a first element (1) which comprises a base element (4) and an elongated connecting unit (5) which projects out from said base element and which is intended for insertion through the article (3) to be protected, and a second element (2) which can be attached to and locked on said connecting unit (5) against movement away from the base element (4), said first element (1) further comprises at least one fragile marking substance container (6) which is intended to be broken, crushed or destroyed in some other way when the connecting unit (5) is manipulated, such as to release the marking substance from the container (6), characterized in that the base element (4) is a one-piece structure;

in that the base element (4) includes a recess (7) having an opening through which the container (6) can be inserted into the recess (7); and in that the connecting unit (5) is insertably arranged in the base element (4) and constructed to hold and fix the marking substance container (6) in the recess (7) and to directly or indirectly break, crush or destroy in some other way the container (6) when the connecting unit (5) is forcibly manipulated.

2. A device according to claim 1, characterized in that the container (6) is supported at least partially in the recess (7) against movement in at least one direction; and in that the connecting unit (5) includes an abutment part (8) which is in direct or indirect abutment with a side of the marking substance container (6) opposite to said direction, so as to firmly hold and fixate the container in the recess (7).

3. A device according to claim 2, characterized in that the connecting unit (5) is resiliently mounted in the base element (4) and includes an elongated connecting element (11) which is insertably mounted in an attachment hole (9) in the base element (4).

4. A device according to claim 3, characterized in that the attachment hole (9) is provided in an attachment bridge (12) which is resiliently arranged in the base element (4).

5. A device according to claim 4, characterized in that the recess (7) in the base element (4) is open in a direction opposite to the outwardly projecting part of the connecting element (11), so that the container (6) in the recess (7) is visible from outside the device.

6. A device according to claim 5, characterized in that the container (6) is an elongated ampule; in that the ampule is supported at its ends in the base element (4) by support parts (21) against movement in a direction towards the outwardly projecting part of the connecting element (11); and in that an opening is provided between the support parts (21) in a direction towards the outwardly projecting part of the connecting element (11) through which opening released marking substance is able to pass when the ampule is broken.

7. A device according to claim 6, characterized in that the connecting element (11) is centrally arranged in the base element (4) includes a circular, outwardly projecting lip (20) coaxially arranged with the connecting element (11), said lip (20) being intended to embrace partially the second element (2) in the locked state.

8. A device according to claim 7, characterized in that either the second element (2) or the base element (4) includes an electronic alarm unit.

9. A device according to claim 8, characterized in that the connecting unit (5) or the base element (4) includes a container breaking element (8; 15; 16) which abuts the marking substance container (6) either directly or indirectly so as to break said container when the connecting unit (5) is forcibly manipulated.

10. A device according to claim 9, characterized in that the container breaking means is comprised of the abutment part (8).

11. A device according to claim 9, characterized in that the connecting element (11) and the attachment hole (9) are dimensioned so that the attachment hole will exert a given resistance to insertion of the connecting element, in the manner of a press fit.

12. A device according to claim 9, characterized in that the connecting element (11) is rotatably mounted in the attachment hole (9) and locked in the inserted position in the base element (4) by means of a locking washer arranged on the connecting element (11).

13. A device according to claim 3 characterized in that the connecting element (11) and the attachment hole (9) are dimensioned so that the attachment hole will exert a given resistance to insertion of the connecting element, in the manner of a press fit.

14. A device according to claim 3 characterized in that the connecting element (11) is rotatably mounted in the attachment hole (9) and locked in the inserted position in the base element (4) by means of a locking washer arranged on the connecting element (11).

15. A device according to claim 1 characterized in that the recess (7) in the base element (4) is open in a direction opposite to the outwardly projecting part of the connecting element (11), so that the container (6) in the recess (7) is visible from outside the device.

16. A device according to claim 1 characterized in that the container (6) is an elongated ampule; in that the ampule is supported at its ends in the base element (4) by support parts (21) against movement in a direction towards the outwardly projecting part of the connecting element (11); and in that an opening is provided between the support parts (21) in a direction towards the outwardly projecting part of the connecting element (11) through which opening released marking substance is able to pass when the ampule is broken.

17. A device according to claim 1 characterized in that the connecting element (11) is centrally arranged in the base element (4); and in that the base element (4) includes a circular, outwardly projecting lip (20) coaxially arranged with the connecting element (11), said lip (20) being intended to embrace partially the second element (2) in the locked state.

18. A device according to claim 1 characterized in that either the second element (2) or the base element (4) includes an electronic alarm unit.

19. A device according to claim 1 characterized in that the connecting unit (5) or the base element (4) includes a container breaking element (8; 15; 16) which abuts the marking substance container (6) either directly or indirectly so as to break said container when the connecting unit (5) is forcibly manipulated.

20. A device according to claim 11, characterized in that the container breaking means is comprised of the abutment part (8).

* * * * *